United States Patent [19]

Kobayashi et al.

[11] Patent Number: 4,877,535

[45] Date of Patent: Oct. 31, 1989

[54] IRON DISPERSANT FOR BOILER WATER

[75] Inventors: Kenji Kobayashi, Yokohama; Ichiro Kaneko, Machida; Masahiro Kobayashi; Shinji Nakano, both of Tokushima, all of Japan

[73] Assignees: Kurita Water Industries, Ltd., Tokyo; Otsuka Chemical Co., Ltd., Osaka, both of Japan

[21] Appl. No.: 237,647

[22] Filed: Aug. 26, 1988

Related U.S. Application Data

[63] Continuation of Ser. No. 565, Jan. 5, 1987, abandoned.

[30] Foreign Application Priority Data

Jan. 13, 1986 [JP] Japan ................................. 61-4806

[51] Int. Cl.$^4$ ................................................. C02F 5/12
[52] U.S. Cl. ..................................... 210/701; 252/180; 525/218; 526/307
[58] Field of Search ....................... 252/180; 210/701; 525/218; 526/307

[56] References Cited

U.S. PATENT DOCUMENTS 3,663,448 5/1972 Ralston ............................... 252/180
4,434,059 2/1984 Johnson et al. ..................... 252/180

FOREIGN PATENT DOCUMENTS 5494482 1/1978 Japan .
60-43494 3/1985 Japan .
61-90797 5/1986 Japan .................................. 252/180

OTHER PUBLICATIONS

"Characterization and Thermal Stability of Polymers for Boiler Treatment", Masler, BF Goodrich, Avon Lake, Ohio, pp. 434 to 446.

*Primary Examiner*—Robert A. Wax
*Attorney, Agent, or Firm*—Felfe & Lynch

[57] ABSTRACT

A composition and method for effectively dispersing iron in water to prevent iron oxide deposits is disclosed. The composition includes a first component which is an acrylic copolymer having repeating units mixed with a second component which is either a homopolymer or copolymer of an acrylate or a methacrylate. The first component includes an acrylic or methacrylic hydrazide and its repeating units include an acrylic or methacrylic amide or alkyl ester. Iron containing water may be treated by adding 0.01–10 mg composition to each liter of water.

16 Claims, No Drawings

IRON DISPERSANT FOR BOILER WATER

This application is a continuation of application Ser. No. 000,565, filed Jan. 5, 1987, now abandoned.

BACKGROUND OF THE INVENTION

The present invention relates to a noble dispersant for iron contained in a boiler water.

In a boiler plant, the iron contents in a boiler feed water are oxidized by dissolved oxygen, and are converted into iron oxide. It is well known that when iron oxide is deposited on the inside wall surface of the boiler plant, corrosion, heat-transfer hindrance, embrittlement accident and other hindrances are caused thereby.

It is customary that raw water of softened water is fed to a boiler operated under a low pressure of 20 Kg/cm$^2$ or less. As the raw water or softened water generally contains iron, said iron contents are oxidized in the low pressure boiler plant, and deposited on the inside wall surface of the plant in the form of Fe$_2$O$_3$. In order to prevent this problem, it has usually been devised to add polyacrylate as a dispersant to the boiler feed water to discharge the iron oxide, which would be deposited within the boiler if said dispersant was not used, out of the system in such a state as dispersed in the water.

In a boiler plant operated under a pressure of 20 Kg/cm$^2$ or more, the thermal load exerted on the boiler is high and the impurities in the feed water extert many influences. Therefore, a demineralized water is used as the feed water in this instance, That is, there has been considered the countermeasure wherein the iron contents in the feed water are removed as much as possible before the feed water is fed to the boiler plant, and further the condensed water is fully treated thereby preventing the iron contents from being introduced into the boiler.

In spite of the above mentioned countermeasure, however, it is impossible to prevent the introduction of iron contents into the boiler completely, and to elude the occurrence of deposits in the boiler. It is known that 80-90% of said deposits are iron oxide in the form of Fe$_3$O$_4$. Therefore, it is normal in the maintenance of a boiler plant to use demineralized water as the boiler feed water and to subject the boiler plant to acid cleaning once every few years.

As described above, in the boiler to which raw water or softened water is fed, polyacrylate as a chemical for dispersing the iron contents in the boiler water. The dispersion effect of polyacrylate is usually used is surely in the practical range but is not satisfactorily enough. And, referring to the boiler to which demineralized water is fed, the dispersion effect is low, namely about 1-30%, even when using polyacrylate. This may be cause the deposits take the form of Fe$_2$O$_4$. In addition to this, addition of polyacrylate is disadvantageous in that the pH of the boiler water is raised over the standard criteria (ex Japanese Industrial Standards B8223).

In Japanese Patent Publication No. 6154/1986, there is disclosed a water soluble high molecular compound having a repeating unit as shown below and used as a boiler water treating agent.

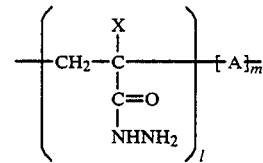

wherein, X stands for a hydrogen atom or a methyl group, A stands for acrylamide, methacrylamide, acrylic ester or methacrylic ester, and l and m stand for mol % of repeating units, l being in the range of 10–100, m being in the range of 0–90.

Japanese Patent Publication No. 6154/1986 teaches that said water soluble high molecular compound displays superior oxygen removal action and scale inhibiting action in the boiler water, but it is utterly silent about prevention or suppression of iron oxide deposit within the boiler. Likewise, Japanese patent application Laid Open No. 94482/1979 discloses a terpolymer having a repeating unit as shown below as a scale inhibitor, but is also utterly silent about prevention or suppression of iron oxide deposits within the boiler.

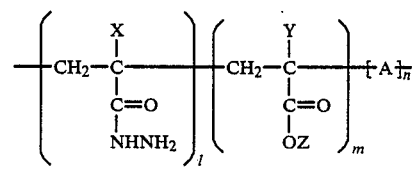

wherein, X and Y each stands for a hydrogen atom or a methyl group, Z stands for a hydrogen atom, sodium, potassium, ammonium, hydrazium or an organic ammonium, A stands for acrylamide, acrylic ester or methacrylic ester, and l, m and n stand for mol % of repeating units in the relation of $5 \leq l \leq 90$, $5 \leq m \leq 90$ and $l + m + n = 100$.

SUMMARY OF THE INVENTION

The present invention proposes a novel iron dispersant for preventing the iron contained unavoidably in a boiler water from depositing in the form of iron oxide. The iron dispersant of the present invention can not only prevent deposition of iron oxide in the boiler to which raw or softened water is fed, giving good results being equal to or more than the usual results obtained from using polyacrylate, but also can exhibit a superior dispersion effect in the boiler to which a demineralized water is fed, and furthermore does not lower the pH of said boiler water.

The iron dispersant according to the present invention comprises a mixture of an acrylic copolymer or terpolymer having a repeating unit shown by the undermentioned formula (1) with a homopolymer or copolymer of acrylate or methacrylate.

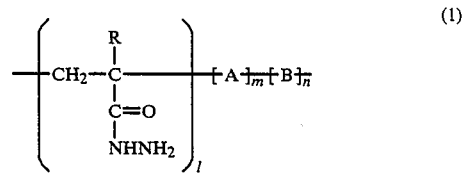
(1)

-continued wherein, R stands for hydrogen or a methyl group, A stands for acrylamide, methacrylamide, acrylic ester or methacrylic ester, B stands for acrylic acid, acrylate, methacrylic acid, methacrylate or a monomer copolymerizable with the repeating unit A, and l, m and n stand for mol % of repeating units being in the relation of $10 \leq l \leq 70$, $10 \leq m \leq 90$, $n \leq 50$ and $l+m+n=100$.

PREFERRED EMBODIMENTS OF THE INVENTION

A first component of the iron dispersant according to the present invention, as shown by the formula (1), is a high molecular compound having (a) an acrylic or methacrylic hydrazide and (b) an acrylamide or methacrylamide, or alkylester as essential repeating units, and having acrylic acid, acrylate, methacrylic acid, methacrylate or a monomer copolymerizable with the repeating unit A as optional repeating units. The acrylic or methacrylic alkyl ester, that can become essential repeating units, includes methyl ester, ethyl ester and butyl ester. The acrylate and methacrylate, that can become optional repeating units, include sodium salt, amine salt and ammonium salt of acrylic acid and analogues of methacrylic acid. The monomer copolymerizable with the repeating unit A includes those such, for instance, as vinyl chloride, vinyl acetate, butadiene, styrene, acrylonitrile and the like.

When expressing the components constituting the high molecular compound shown by the formula (1) in terms of mol %, the repeating unit comprised of acrylic or methacrylic hydrazide is in the range of 10–70 mol%, and the repeating unit A is in the range of 10–90 mol%. In case the high molecular compound (1) contains an optional repeating unit B, its amount is 50 mol% or less. It is not desirable from the viewpoint of expecting the iron dispersant of the present invention to achieve both the iron dispersing ability and the oxygen removal ability simultaneously that the mol% of each repeating unit deviates from the above prescribed range. In case the mol% of each repeating unit is within the above prescribed range, however, the high molecular compound (1) may be any one of a block copolymer, alternating copolymer or random copolymer. It is desirable that the intrinsic viscosity of the high molecular compound (1) measured by using a 1 normal of sodium nitrate solution as a solvent and at a temperature of 30° C. is 0.03 (g/dl) or more.

The high molecular compound (1) of the present invention can be prepared by means of a known optional process. One typical manufacturing process comprises making an aqueous hydrazine hydrate solution act upon polyacrylamide or polyacrylate and substituting a hydorazino group for part of the amide group or ester linkage. The starting material used in this process may be any one of polymethacrylamide and polymethacrylate, and may also be a copolymer consisted of optional two kinds or more of monomers selected from the group consisting of acrylamide, methacrylamide, acrylic ester and methacrylic ester. And, the polymer or copolymer used as the starting material may contain said separating unit B.

A second component of the iron dispersant according to the present invention is a homopolymer or copolymer of acrylate or methacrylate. The acrylate includes sodium acrylate and ammonium acrylate, and the methacrylate includes sodium methacrylate and ammonium methacrylate. The components being copolymerizable with said acrylate or methacrylate include acrylamide, hydroxyethyl methacrylate, 3-allyloxy-2-hydroxypropanesulfonate, 3-allyloxy-1,2-dihydroxypropanesulfonate and the like. The high molecular compound, namely the second component of the present invention, contains 50 mol% or more of the repeating unit that comprises acrylate and/or methacrylate, and has the molecular weight of 300–100,000, preferably 500–40,000.

The mixing ratio of the second component to the first component in the iron dispersant according to the present invention is in the range of 9:1–1:9, preferably 7:3–3:7 by weight.

The moiety

of the high molecular compound (1), namely the first component, is hydrolyzed in the water to produce hydrazine. The oxygen dissolved in the water can be removed by the action of said hydrazine. It is feared that as said moiety is converted into a carboxyl group by separation of the hydrazine, the pH value is lowered. According to the present invention, however, the lowering of the pH value is controlled by the action of the second component that coexists with the first component. In other words, the homopolymer or copolymer of acrylate or methacrylate, that is the second component of the present invention, is subjected to decarboxylation caused by heat decomposition in the water and generates alkali, whereby the lowering of the pH can be controlled.

Accordingly, addition of the iron dispersant of the present invention in an effective amount, typically in an amount of 0.01–10 mg/l or so, to a boiler feed water effectively prevent iron oxide deposits in the boiler, said deposits being caused by the iron contained in the feed water, without distinction of the kind thereof. The iron dispersant according to the present invention displays an exceedingly superior effect particularly in a pure water-fed boiler which is operated under an intermediate pressure or a high pressure and has not usually used any iron dispersant, because the iron dispersant according to the present invention can display a superior effect for preventing deposits of iron oxide while holding the pH value of the boiler water at the control target value. And, the dispersant of the present invention can be used together with the other boiler water modifiers such as a scale inhibitor and the like.

EXAMPLE

The iron dispersant according to the present invention and the conventional iron dispersant were compared in performance in a boiler fed with pure water at the rate of 120 m$^3$/hr and operated under a pressure of 40 Kg/cm$^2$.

In a first test, boiler feed water (demineralized water) was mixed with 0.5 mg/l of hydrazine and 4.6 mg/l of sodium polyacrylate. Thus, the boiler was operated to examine the boiler blow water for 3 days. In a second test, boiler feed water (demineralized water) was fed with the iron dispersant of the present invention consisting of 2 parts by weight of a high polymer compound having 60 mol% of a repeating unit comprising an acrylic hydrazide and having 40 mol% of a repeating unit comprising acrylamide and 1 part by weight of sodium polyacrylate at the rate of 4.6 mg/l. Thus, the boiler was operated to examine the boiler blow water for 3 days in the same manner as the previous case.

It was observed from the test results that assuming that the concentration of iron in the boiler blow water used in the first test was 100, the iron concentration in the second test using the iron despersant of the present invention was 160.

Further, the amounts of oxygen dissolved in the boiler water and the stem condensed water were measured to find that both were 0.0 μg/l, which showed the iron dispersant of the present invention to be also effective in the oxygen removal ability to the same degree as the conventional oxygen scavenger, hydrazine. Still further, referring to the pH of boiler water, the test results showed that the pH of boiler water in the first test was 10.2–10.6, exceeding the control target value of 9.5–10.2, while the pH of boiler water in the second test using the iron dispersant according to the present invention was superior, namely, 10.0–10.2.

We claim:

1. A composition used to disperse iron in boiler water comprising:
   (a) a first component which is an acrylic copolymer having repeating unit:

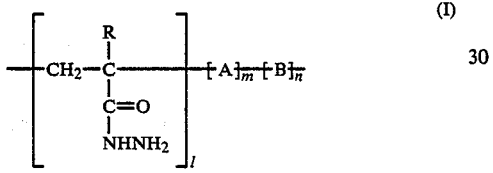

(I)

wherein R represents hydrogen or a methyl group; A is a repeating unit representing acrylamide, methacrylamide, acrylic alkyl ester or methacrylic alkyl ester; B is a repeating unit representing acrylic acid, acrylate, methacrylic acid, methacrylate or a monomer copolymerizable with the repeating unit A; l represents a molecular percentage of repeating units of the first component of $10 \leq l \leq 70$; m represents a molecular percentage of repeating units of the first component of $10 \leq m \leq 90$; and n represents a molecular percentage of repeating units of the first component of $0 \leq n \leq 50$, the sum of the molecular percentage of repeating units of l, m and n being 100; and
   (b) a second component of at least one of a homopolymer or a copolymer of one of an acrylate or a methacrylate, wherein said second component and said first component are present in the composition in a range from 9:1 to 1:9 by weight of each of the components.

2. The composition of claim 1 wherein said second component and said first component are present in the composition in a range from 7:3 to 3:7 by weight of each component.

3. The composition of claim 1 wherein said first component is an acrylic terpolymer.

4. The composition of claim 1 wherein the acrylic alkyl ester or methacrylic alkyl ester of the repeating unit A is at least one selected from the group of methyl ester, ethyl ester and butyl ester.

5. The composition of claim 1 wherein the acrylate and the methylacrylate of the repeating unit B is at least one selected from the group consisting of sodium acrylate, amine acrylate, an ammonium salt of acrylic acid and analogues of methacrylic acid.

6. The composition of claim 1 wherein the monomer copolymerizable with the repeating unit A is at least one selected from the group consisting of vinyl chloride, vinyl acetate, butadiene, styrene and acrylonitrile.

7. The composition of claim 1 wherein said second component has a molecular weight in the range of from 300 to 100,000 and contains at least 50 molecular percentage of the repeating unit consisting of one of an acrylate, a methacrylate and mixture thereof.

8. The composition of claim 7 wherein said second component has a molecular weight in the range of from 500 to 40,000.

9. A composition according to claim 1 wherein said composition is used in a boiler which is fed demineralized water as a feed water.

10. The composition of claim 9 wherein said boiler is operated under a pressure of 20 kg/cm$^2$ or more.

11. The composition of claim 1 wherein said second component is at least one homopolymer selected from the group consisting of sodium polyacrylate, ammonium polyacrylate, sodium polymethacrylate and ammonium methacrylate.

12. A composition used to disperse iron in boiler water comprising:
   (a) a first component which is an acrylic copolymer having repeating unit:

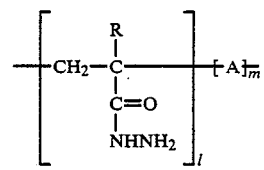

wherein R represents hydrogen or a methyl group; A is a repeating unit representing acrylamide or methacrylamide; l represents a molecular percentage of repeating units of the first component of $10 \leq l \leq 70$; m represents a molecular percentage of repeating units of the first component of $10 \leq m \leq 90$; the sum of the molecular percentage of repeating units of l and m being 100; and
   (b) a second component of at least one of a homopolymer or a copolymer consisting of one of an acrylate or a methacrylate, wherein said second component and said first component are present in the composition in a range of from 9:1 to 1:9 by weight of each of components.

13. A process for dispersing iron in boiler water comprising:
adding a composition to the water in an amount ranging from 0.01 to 10 mg composition to each liter of water, the composition having a first component which is an acrylic copolymer having repeating unit:

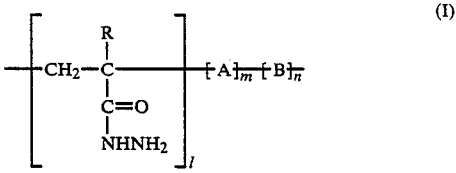

(I)

wherein R represents hydrogen or a methyl group; A is a repeating unit representing acrylamide, methacrylamide, acrylic alkyl ester or methacrylic alkyl ester; B is a repeating unit representing acrylic acid, acrylate, methacrylic acid, methacrylate or a monomer copolymerizable with the repeating unit A; $l$ represents a molecular percentage of repeating units of the component of $10 \leq l \leq 70$; m represents a molecular percentage of repeating units of the component of $10 \leq m \leq 90$; and n represents a molecular percentage of repeating units of the component of $0 \leq n \leq 50$, the sum of the molecular percentage of repeating units of l, m and n being 100; and a second component of at least one of a homopolymer or a copolymer consisting of one of an acrylate or a methacrylate, wherein said second component and said first component are present in the composition in a range from 9:1 to 1:9 by weight of each of the components to thereby prevent formation of iron oxide deposits in the boiler water.

14. The process of claim 13 wherein said composition is used in a boiler which is fed demineralized water as a feed water.

15. The process of claim 14 wherein said boiler is operated under a pressure of 20 kg/cm² or more.

16. A process for dispersing iron in boiler water comprising:
adding a composition to the boiler water in an amount ranging from 0.01 to 10 mg composition to each liter of the boiler water, the composition having a first component which is an acrylic copolymer having repeating unit:

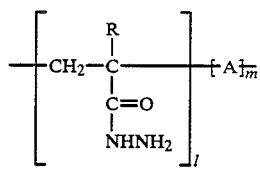

wherein R represents hydrogen or a methyl group; A is a repeating unit representing acrylamide or methacrylamide; l represents a molecular percentage of repeating units of the first component of $10 \leq l \leq 70$; m represents a molecular percentage of repeating units of the first component $10 \leq m \leq 90$; the sum of the molecular percentage of repeating units of l and m being 100; and a second component of at least one of a homopolymer or a copolymer consisting of one of an acrylate or a methacrylate wherein said second component and said first component are present in the composition in a range of from 9:1 to 1:9 by weight of each of components, to thereby prevent formation of iron oxide deposits in the boiler water.

* * * * *

UNITED STATES PATENT AND TRADEMARK OFFICE
CERTIFICATE OF CORRECTION

PATENT NO. : 4,877,535
DATED : October 31, 1989
INVENTOR(S) : Kenji Kobayashi et al It is certified that error appears in the above-identified patent and that said Letters Patent is hereby corrected as shown below:

Column 1, line 53, after "polyacrylate" insert --is usually used--.

Column 1, line 55, delete "is usually used".

Column 1, line 60, "$Fe_2O_4$" should read --$Fe_3O_4$--.

Signed and Sealed this

Twelfth Day of February, 1991

Attest:

HARRY F. MANBECK, JR.

*Attesting Officer*  *Commissioner of Patents and Trademarks*